(12) United States Patent
Kishi et al.

(10) Patent No.: US 12,092,244 B2
(45) Date of Patent: Sep. 17, 2024

(54) PIPE JOINT

(71) Applicant: KUBOTA CORPORATION, Osaka (JP)

(72) Inventors: Shozo Kishi, Amagasaki (JP); Keita Oda, Amagasaki (JP); Ryunosuke Tanaka, Amagasaki (JP)

(73) Assignee: KUBOTA CORPORATION, Osaka (JP)

( * ) Notice: Subject to any disclaimer, the term of this patent is extended or adjusted under 35 U.S.C. 154(b) by 154 days.

(21) Appl. No.: 17/769,372

(22) PCT Filed: Oct. 5, 2020

(86) PCT No.: PCT/JP2020/037732
§ 371 (c)(1),
(2) Date: Apr. 15, 2022

(87) PCT Pub. No.: WO2021/075298
PCT Pub. Date: Apr. 22, 2021

(65) Prior Publication Data
US 2023/0091354 A1    Mar. 23, 2023

(30) Foreign Application Priority Data
Oct. 18, 2019  (JP) ................. 2019-190625

(51) Int. Cl.
*F16L 21/04*  (2006.01)
*F16L 21/08*  (2006.01)
*F16L 57/02*  (2006.01)

(52) U.S. Cl.
CPC .............. *F16L 21/08* (2013.01); *F16L 21/04* (2013.01); *F16L 57/02* (2013.01)

(58) Field of Classification Search
CPC .................. F16L 21/04; F16L 37/127
See application file for complete search history.

(56) References Cited

U.S. PATENT DOCUMENTS 3,941,410 A * 3/1976 Miyaoka ............ F16L 21/04
                                                285/321
4,183,561 A   1/1980 Miyamoto et al.
(Continued)

FOREIGN PATENT DOCUMENTS

DE     19614073 A1 * 1/1997  .............. F16L 21/04
JP     S53-129642 U    10/1978
(Continued)

OTHER PUBLICATIONS

International Search Report from corresponding International Patent Application No. PCT/JP20/37732, dated Dec. 8, 2020.
(Continued)

*Primary Examiner* — Amber R Anderson
*Assistant Examiner* — Fannie Kee
(74) *Attorney, Agent, or Firm* — KUSNER & JAFFE

(57) ABSTRACT

In a pipe joint, a spigot is inserted into a socket; a lock ring is accommodated in a lock ring-accommodating groove formed in the inner circumference of the socket; and an engaging part formed in the outer circumference of the spigot, wherein the engaging part engages with the lock ring from a back side of the socket in a separation direction A of the spigot, thereby preventing the spigot from separating from the socket. The engaging part is formed at a position receding from a distal end of the spigot in the separation direction A of the spigot. A bending suppressing member for restricting the socket and the spigot in a bending direction C is provided between the inner circumference of the socket and the outer circumference of the spigot in the range between the distal end of the spigot and the engaging part.

4 Claims, 15 Drawing Sheets

(56) References Cited

U.S. PATENT DOCUMENTS

| | | |
|---|---|---|
| 2011/0278835 A1 | 11/2011 | Kishi et al. |
| 2015/0362103 A1* | 12/2015 | Kishi .................... F16L 21/04 703/1 |
| 2020/0208765 A1* | 7/2020 | Kishi .................... F16L 21/04 |
| 2021/0095798 A1 | 4/2021 | Kishi et al. |

FOREIGN PATENT DOCUMENTS

| | | | | |
|---|---|---|---|---|
| JP | 54-034125 A | | 3/1979 | |
| JP | S54-043315 A | | 4/1979 | |
| JP | S55-046840 U1 | | 3/1980 | |
| JP | S57-083982 U1 | | 5/1982 | |
| JP | S58-015671 B | | 3/1983 | |
| JP | S60-017590 Y | | 5/1985 | |
| JP | H07-260059 A | | 10/1995 | |
| JP | 10332061 A | * | 12/1998 | .............. F16L 21/04 |
| JP | 2000146045 A | * | 5/2000 | .............. F16L 21/04 |
| JP | 2004-162854 A | | 6/2004 | |
| JP | 2004-263813 A | | 9/2004 | |
| JP | 2006-070994 A | | 3/2006 | |
| JP | 2008-089095 A | | 4/2008 | |
| JP | 2008075841 A | * | 4/2008 | .............. F16L 21/04 |
| JP | 2011085162 A | * | 4/2011 | .............. F16L 21/04 |
| JP | 2011-106671 A | | 6/2011 | |
| JP | 2017-072222 A | | 4/2017 | |
| JP | 2019163809 A | * | 9/2019 | .............. F16L 21/04 |
| JP | 2021-067282 A | | 4/2021 | |
| WO | WO2019/181918 A1 | | 9/2019 | |

OTHER PUBLICATIONS

Office Action (with English translation) issued Oct. 16, 2023 in related/corresponding Chinese Patent Appl. No. 202080070438.0.
Decision to Grant a Patent issued in corresponding Japanese Patent Application No. 2019-190624 dated Oct. 24, 2023.
Office Action dated Feb. 20, 2023 (with English-language translation of portion of document) from related/corresponding Iranian Patent Application No. 140150140003000378.
Extended European Search Report dated Nov. 9, 2022 in corresponding European Patent Application No. 20876888.7.
Decision to Grant a Patent issued in corresponding Japanese Patent Application No. 2019-190625 dated Oct. 24, 2023.

* cited by examiner

PIPE JOINT

FIELD OF INVENTION

The present invention relates to a pipe joint having a separation preventive function, the pipe joint being required to ensure a predetermined level of bending rigidity to cope with thrust force (unbalanced force) which acts on a pipe line.

BACKGROUND OF INVENTION

Conventionally, as a pipe joint of this type, for example, there is a pipe joint 100 in which a spigot 104 of a first pipe 103 is inserted into a socket 102 of a second pipe 101 as shown in FIG. 15. A lock ring-accommodating groove 105 is formed in the inner circumference of the socket 102, and a lock ring 106 is accommodated in the lock ring-accommodating groove 105. A spigot protrusion 107 is formed on the outer circumference of the spigot 104. It is possible to prevent the spigot 104 from separating from the socket 102 by the spigot protrusion 107 engaging with the lock ring 106 from the back side of the socket in a separation direction A of the spigot 104.

In general, thrust force (force to move the pipe by water pressure in the pipe) is exerted in a bent section, a branch section of a pipe line, or the like. If, for a pipe line in which such thrust force is exerted, a pipe joint 100 having a separation preventive function as described above is used, the pipe line expands/contracts, or bends in the direction in which thrust force is exerted, due to the expansion/contraction function of the pipe joint 100. This will cause a risk that the sealability of the pipe joint 100 is adversely affected.

As a countermeasure for this, a cylindrical liner 108 is mounted between the distal end of the spigot 104 and the back end part of the socket 102 of the pipe joint 100 which is within a range in which thrust force of the pipe line is exerted.

Since mounting such liner 108 secures the spigot 104 so as not to relatively move in the pipe axis direction within the socket 102, the expansion/contraction and bending of the pipe joint 100 is restricted, and the bending rigidity of the pipe joint 100 is increased, thereby enabling to counteract the thrust force.

It is noted that as the pipe joint 100 as described above, reference may be made to Japanese Patent Laid-Open No. 2004-263813.

However, a conventional system described above unfortunately cannot achieve sufficient bending rigidity of the pipe joint 100 solely by mounting the liner 108 especially when the diameter of the pipes 101 and 103 is large.

SUMMARY OF INVENTION

It is an object of the present invention to provide a pipe joint which enables to achieve sufficient bending rigidity.

Solution to Problem

A pipe joint of the present invention includes:
a spigot of a first pipe;
a socket of a second pipe, the spigot of the first pipe being to be inserted into the socket of the second pipe;
a lock ring-accommodating groove formed in an inner circumference of the socket;
a lock ring to be accommodated in the lock ring-accommodating groove; and
an engaging part formed in an outer circumference of the spigot, the engaging part being to be engaged with the lock ring from a back side of the socket in a separation direction of the spigot to prevent the spigot from separating from the socket, wherein
the engaging part is formed at a position receding in the separation direction of the spigot from a distal end of the spigot, and
a bending suppressing member for restricting the socket and the spigot in the bending direction is provided between the inner circumference of the socket and the outer circumference of the spigot in the range between the distal end of the spigot and the engaging part.

According to this, since the socket and the spigot are restricted in the bending direction by providing a bending suppressing member between the inner circumference of the socket and the outer circumference of the spigot in the range between the distal end of the spigot and the engaging part, the bending rigidity of the pipe joint increases, thereby enabling to achieve sufficient bending rigidity.

According to the pipe joint of the present invention, the bending suppressing member is preferably a ring-shaped member.

According to the pipe joint of the present invention, the bending suppressing member is preferably divided into a plurality of arcuate bending suppressing pieces in the circumferential direction.

According to this, by inserting each bending suppressing piece between the inner circumference of the socket and the outer circumference of the spigot in the range between the distal end of the spigot and the engaging part to dispose in a ring shape, it is possible to easily mount the bending suppressing member.

According to the pipe joint of the present invention, an expansion/contraction suppressing member for restricting the socket and the spigot in the pipe axis direction is preferably provided between the distal end of the spigot and the back end part of the socket.

According to this, the expansion/contraction of the pipe joint is restricted, and the bending rigidity of the pipe joint increases.

According to the pipe joint of the present invention, the expansion/contraction suppressing member is preferably a ring-shaped member.

According to the pipe joint of the present invention, the expansion/contraction suppressing member preferably inhibits the bending suppressing member from deviating in the pipe axis direction through between the inner circumference of the socket and the outer circumference of the spigot and slipping out to between the distal end of the spigot and the back end part of the socket.

According to this, it is possible to prevent the bending suppressing member from slipping out through between the inner circumference of the socket and the outer circumference of the spigot into between the distal end of the spigot and the back end part of the socket to be separated.

Advantageous Effects of Invention

According to the present invention as described above, since the socket and the spigot are restricted in the bending direction by providing a bending suppressing member between the inner circumference of the socket and the outer circumference of the spigot in the range between the distal end of the spigot and the engaging part, the bending rigidity of the pipe joint increases, thereby enabling to achieve sufficient bending rigidity.

DETAILED DESCRIPTION OF INVENTION

Hereinafter, an embodiment of the present invention will be described with reference to the drawings.

Figure 1:
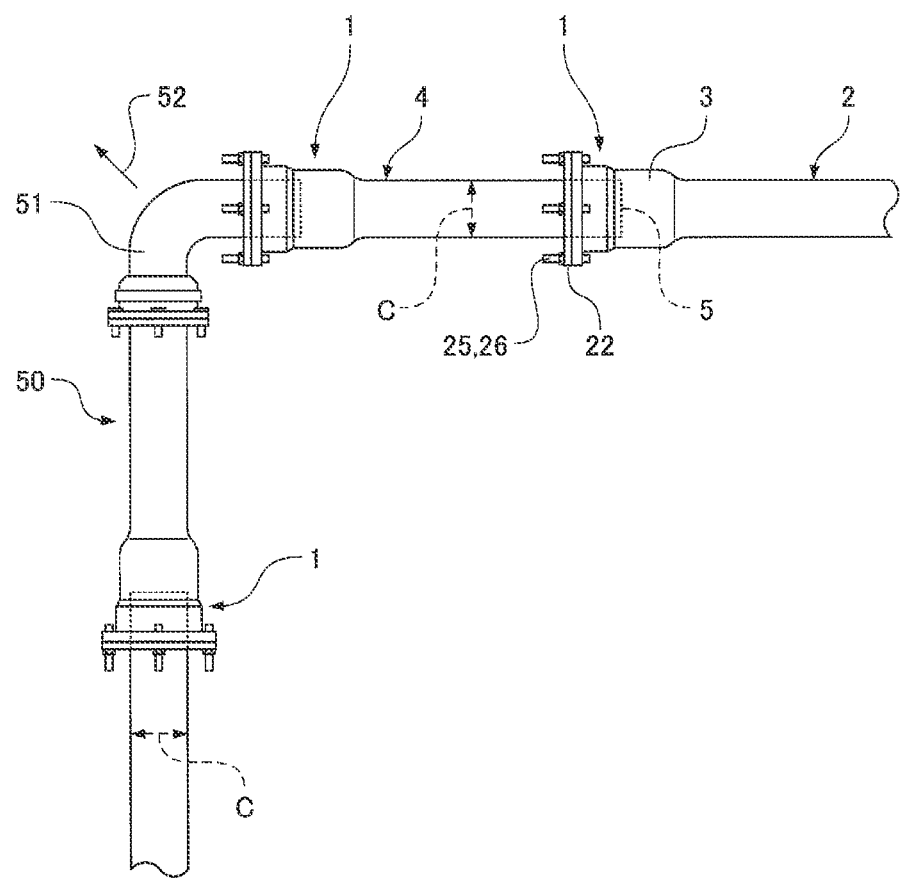
FIG. 1 is a plan view of a pipe line having a pipe joint according to an embodiment of the present invention.

As shown in FIG. 1, a pipe line 50, which is formed by joining a plurality of pipes, has a bent section 51 which is bent at a right angle, and a pipe joint 1. Thrust force 52 is exerted on the bent section 51.

In the pipe joint 1 which has a separation preventive function, a spigot 5 of a first pipe 4 is inserted into a socket 3 of a second pipe 2. Note that for example, ductile iron pipes are used for these pipes 2 and 4.

Figure 2:
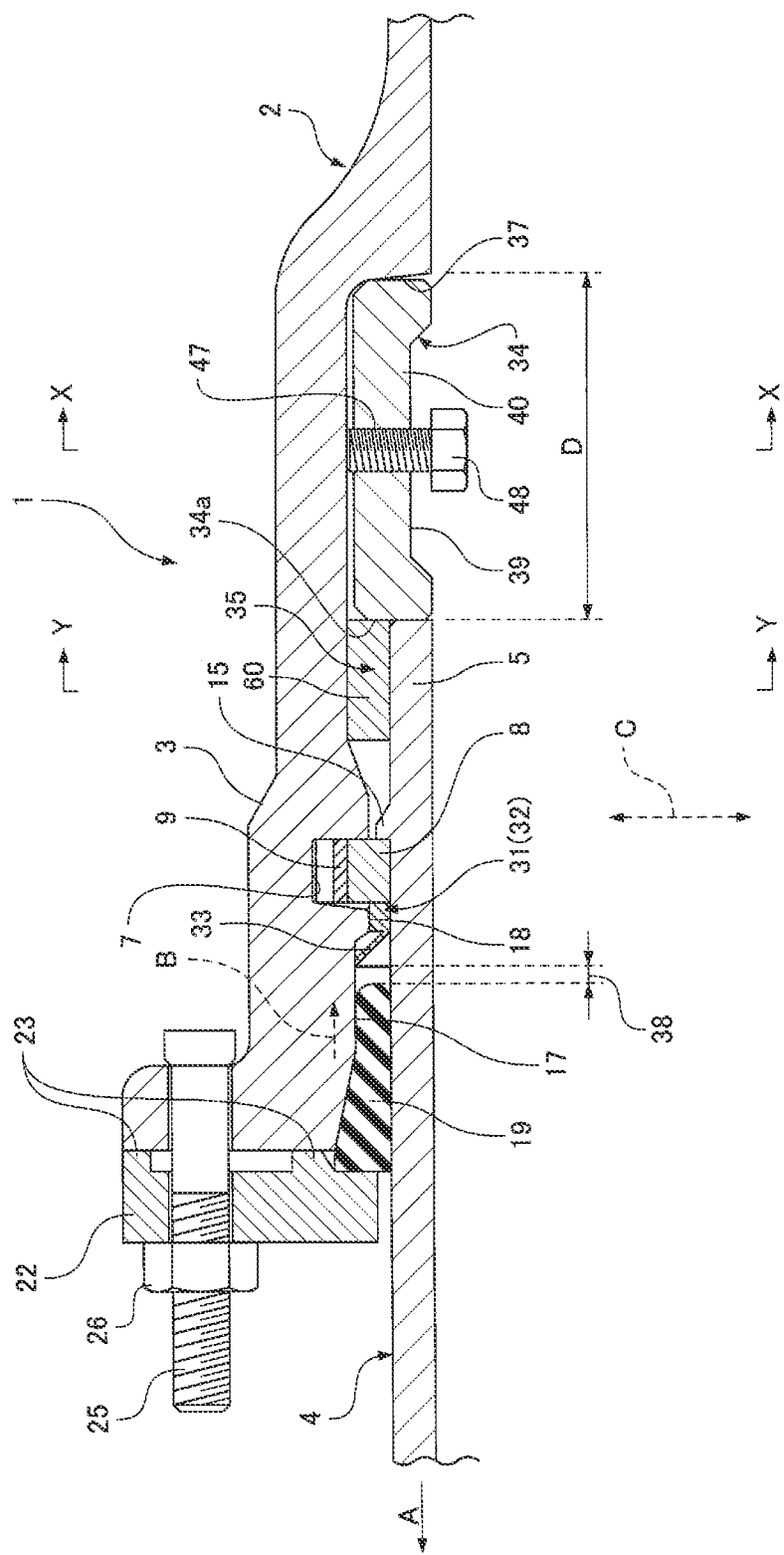
FIG. 2 is a sectional view of the pipe joint according to the same.

As shown in FIG. 2, a lock ring-accommodating groove 7 is formed on the inner peripheral surface of the socket 3 over the entire circumference. The lock ring-accommodating groove 7 accommodates a lock ring 8 and an annular press member 9 that presses the lock ring 8 inward in the pipe radial direction.

Figure 3:
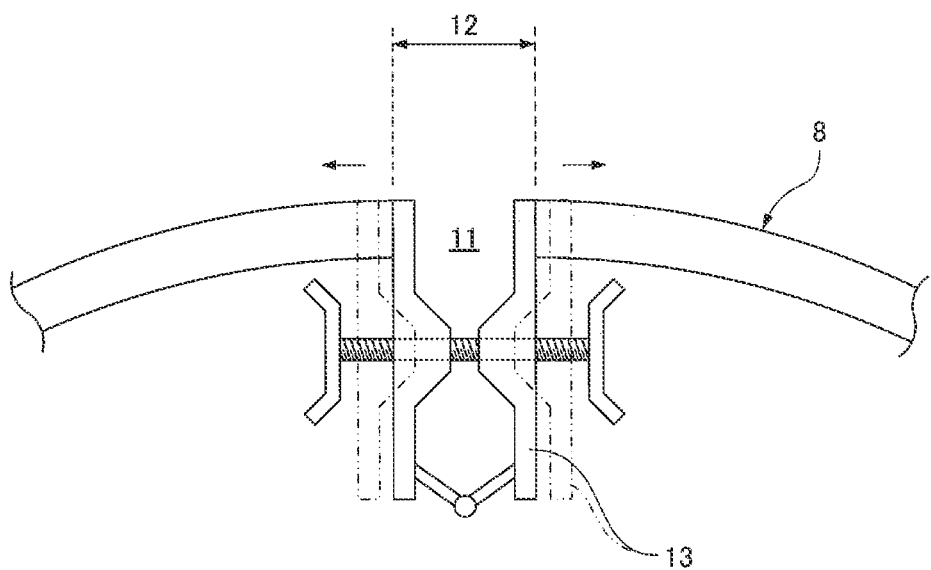
FIG. 3 shows a lock ring when its diameter is expanded, the lock ring being to be provided in the pipe joint according to the same.

As shown in FIG. 3, the lock ring 8 is a ring having a split structure in which one portion thereof is cut. The lock ring 8 has elasticity such that its diameter is expanded by expanding a width 12 of a cut portion 11 with an expander 13 and reduced to return to the original diameter by removing the expander 13 from the cut portion 11.

As shown in FIG. 2, a spigot protrusion 15 (an example of the engaging part) is formed on the outer circumference of the spigot 5 over the entire circumference. The spigot protrusion 15 is formed at a position receding by a predetermined distance from the distal end of the spigot 5 in a separation direction A of the spigot 5. It is possible to prevent the spigot 5 from separating from the socket 3 by the spigot protrusion 15 engaging with the lock ring 8 from the back side of the socket in the separation direction A of the spigot 5. Note that when the spigot protrusion 15 engages with the lock ring 8 as described above, a spacing D between the distal end of the spigot 5 and a back end face 37 (an example of the back end part) of the socket 3 becomes maximum.

Figure 11:
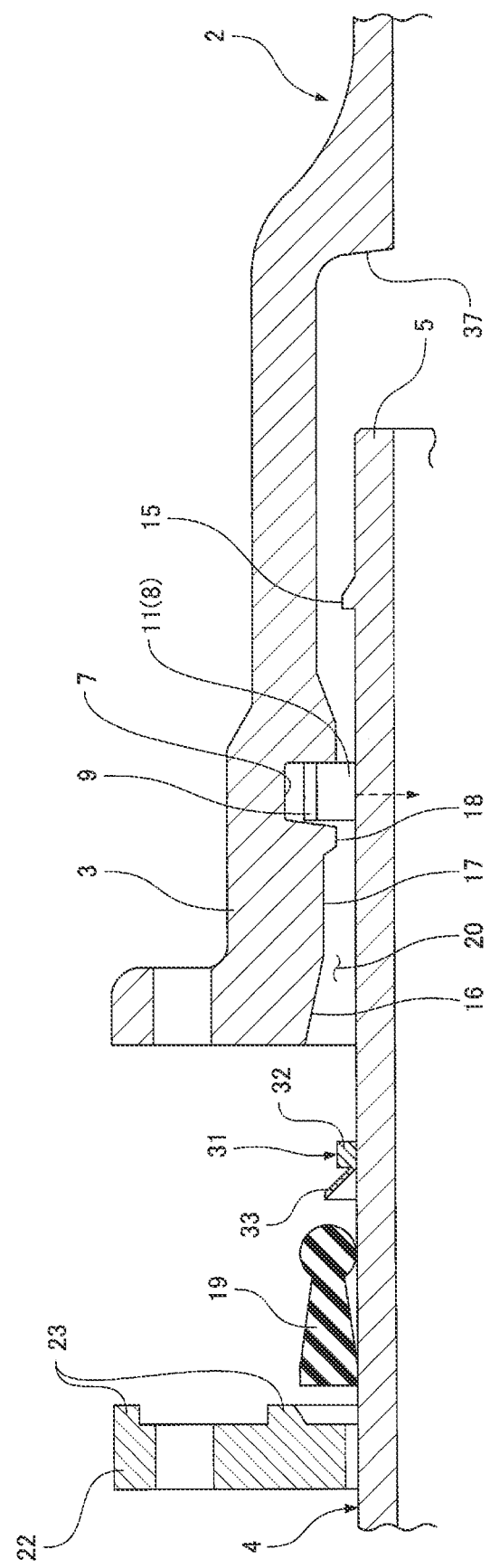
FIG. 11 is a sectional view to show the method of joining pipes in the pipe joint according to the same.

As shown in FIG. 11, the inner peripheral surface of the socket 3 includes a tapered section 16 which is gradually reduced in diameter from an opening end face to the back side of the socket 3, a straight section 17 which extends straight from the back end of the tapered section 16 to the back side, and a socket protrusion 18 which protrudes inward from the back end of the straight section 17 in the pipe radial direction. The straight section 17 is formed to have a constant inner diameter in the pipe axis direction. The socket protrusion 18 is provided over the entire circumference between the straight section 17 and the lock ring-accommodating groove 7 in the pipe axis direction, and has a smaller inner diameter than that of the straight section 17.

As shown in FIG. 2, on the side of the socket opening end with respect to the lock ring 8, a seal ring 19 which is compressed in the pipe radial direction to seal between the inner peripheral surface of the socket 3 and the outer peripheral surface of the spigot 5 is provided. The seal ring 19 is a ring made of rubber (a rubber ring) and is inserted into a seal ring insertion space 20. Note that the seal ring insertion space 20 is, as shown in FIG. 11, formed over the entire circumference between the tapered section 16 and straight section 17 of the socket 3, and the outer peripheral surface of the spigot 5.

As shown in FIG. 2, a press ring 22 for pressing the seal ring 19 to the back side of the socket is provided at the opening end part of the socket 3. The press ring 22 has an abutting part 23 that abuts against the opening end face of the socket 3 in a pressing direction B in which it presses the seal ring 19, and is connected to the opening end part of the socket 3 by a plurality of bolts 25 and nuts 26.

Figure 4:
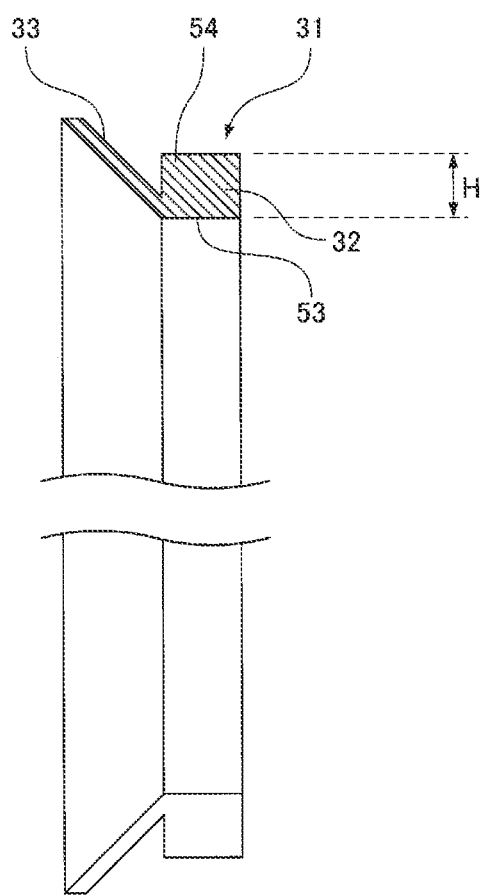
FIG. 4 is a sectional view of a ring body to be provided in the pipe joint according to the same.
Figure 5:
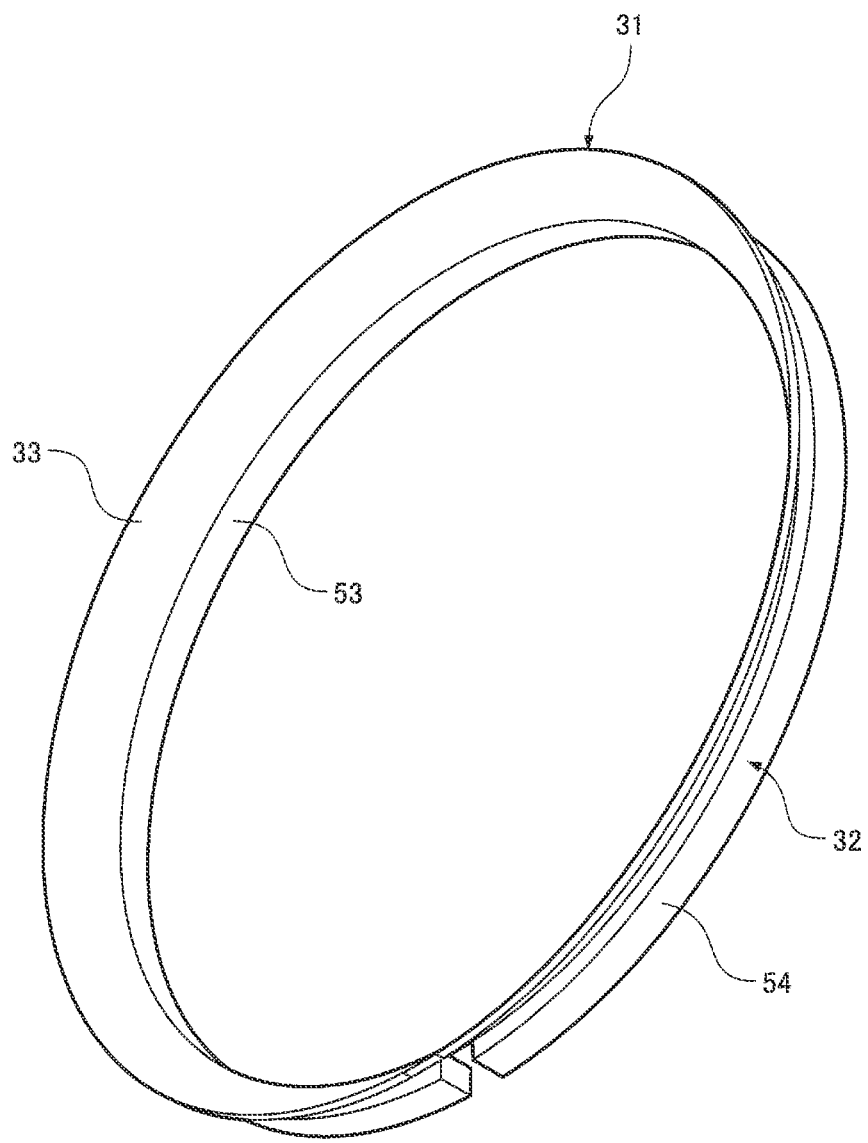
FIG. 5 is a perspective view of the ring body to be provided in the pipe joint according to the same.

A ring body 31 is provided between the lock ring 8 and the seal ring 19 in the pipe axis direction. As shown in FIGS. 2, 4, and 5, the ring body 31, which is a ring having a split structure in which one portion is cut, is made of a material such as elastic resin. The ring body 31 has an annular main body part 32 having a split structure, and a deviation prevention member 33 for preventing the main body part 32 from deviating toward the opening end side of the socket 3.

The main body part 32 has a rectangular cross sectional shape, and is inserted into between the inner peripheral surface of the socket protrusion 18 and the outer peripheral surface of the spigot 5, thereby moving the spigot 5 in the pipe radial direction with respect to the socket 3 so that deviation between the axis of the first pipe 4 and the axis of the second pipe 2 in the pipe radial direction is reduced.

A height H in the radial direction from an inner peripheral surface 53 to an outer peripheral surface 54 of the main body part 32 is set to less than a half value of the difference between the allowable minimum value of the inner diameter of the socket protrusion 18 and the allowable maximum value of the outer diameter of the spigot 5.

In the deviation prevention member 33, the distal end part in the pipe axis direction is abuttable against the straight section 17 of the inner peripheral surface of the socket 3, and the base end part in the pipe axis direction is integrally provided on the inner circumferential side of the main body part 32. The deviation prevention member 33 has a ring shape that expands in diameter in a conical shape from the base end part to the distal end part, and also has a split structure.

Note that a gap 38 is formed over the entire circumference between the seal ring 19 and the ring body 31 in the pipe axis direction.

Further, as shown in FIG. 2, the pipe joint 1 is provided with an expansion/contraction suppressing member 34 and a bending suppressing member 35 for counteracting the thrust force 52 (see FIG. 1). The expansion/contraction suppressing member 34 is a member that restricts the socket 3 and the spigot 5 in the pipe axis direction, and is removably provided between the distal end of the spigot 5 and the back end face 37 of the socket 3. By providing the expansion/contraction suppressing member 34, the spacing D between the distal end of the spigot 5 and the back end face 37 of the socket 3 is kept at maximum.

Figure 6:
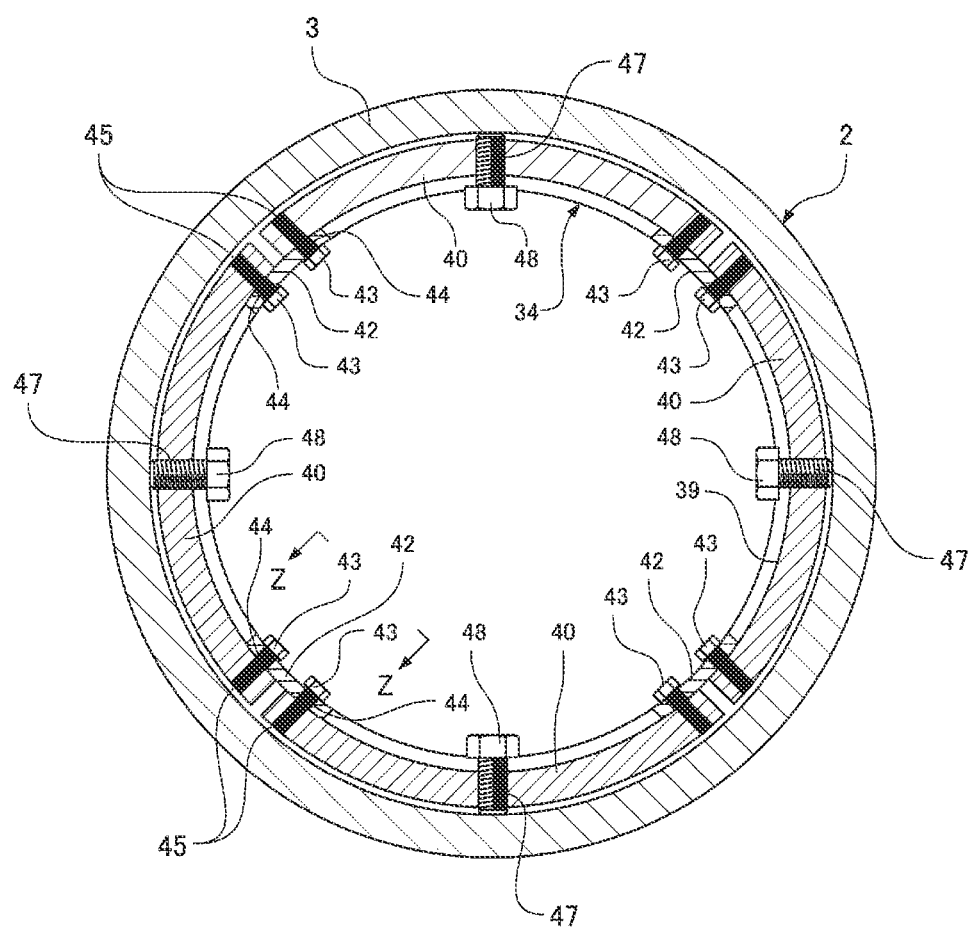
FIG. 6 shows a view taken along an arrow X-X in FIG. 2.
Figure 7:
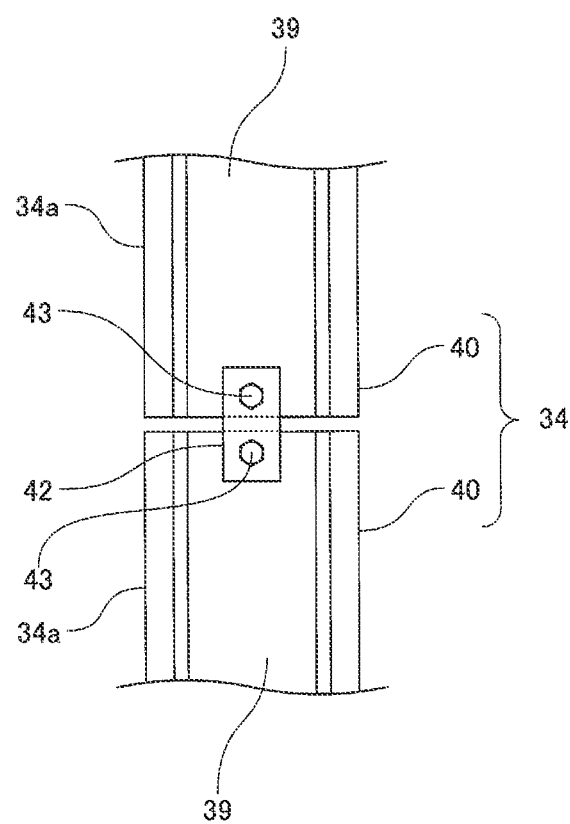
FIG. 7 shows a view taken along an arrow Z-Z in FIG. 6.

As shown in FIGS. 2, 6, and 7, the expansion/contraction suppressing member 34 is a cylindrical member made of metal and having a recessed part 39 in the inner circumference, and is divided into a plurality (for example, four in FIG. 6) of arcuate expansion/contraction suppressing pieces 40 in the circumferential direction. The end parts of one and the other of the adjacent expansion/contraction suppressing pieces 40 in the circumferential direction are connected via a connecting plate 42 and a plurality of connecting bolts 43. That is, a plurality of bolt holes 44 are formed in the connecting plate 42 and a connecting screw hole 45 is formed at an end part of the expansion/contraction suppressing piece 40. Then, by inserting the connecting bolt 43 into the bolt hole 44 of the connecting plate 42 and screwing it into the connecting screw hole 45 of the expansion/contraction suppressing piece 40, the end part of one of the expansion/contraction suppressing pieces 40 and the end part of the other of the expansion/contraction suppressing pieces 40 are connected.

Further, in each expansion/contraction suppressing piece 40, a centering screw hole 47 that penetrates through the inner peripheral surface and the outer peripheral surface is formed. A centering bolt 48 that aligns the center of the expansion/contraction suppressing member 34 with the center of the pipe 2 is screwed into each centering screw hole 47. By turning each centering bolt 48, the expansion/contraction suppressing member 34 is moved in the pipe radial direction.

Note that while the inner diameter of the expansion/contraction suppressing member 34 is the same, or approximately same as the inner diameter of the spigot 5, the outer diameter of the expansion/contraction suppressing member 34 is larger than the outer diameter of the spigot 5. As a result of this, as shown in FIG. 2, one end face 34*a* of the expansion/contraction suppressing member 34 in the pipe axis direction protrudes as a step to the outside in the pipe radial direction from the outer circumference of the spigot 5 over the entire circumference.

Figure 8:
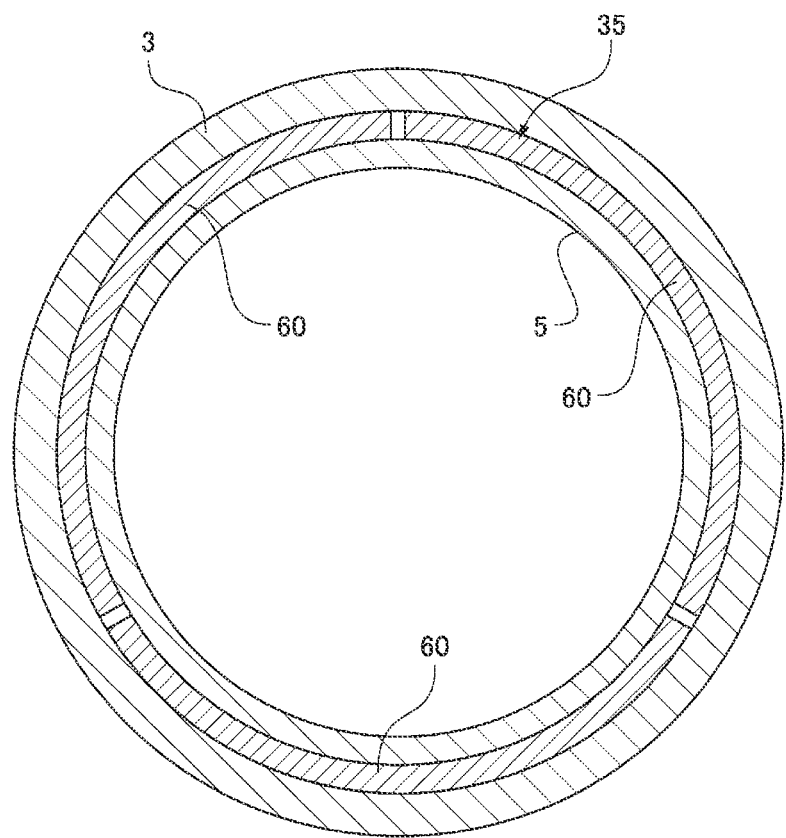
FIG. 8 shows a view taken along an arrow Y-Y in FIG. 2.

As shown in FIGS. 2 and 8, the bending suppressing member 35 is a member for restricting the socket 3 and the spigot 5 in a bending direction C, and is removably provided between the inner circumference of the socket 3 and the outer circumference of the spigot 5 in the range between the distal end of the spigot 5 and the spigot protrusion 15. This bending suppressing member 35 is a ring-shaped member made of metal, and is divided into a plurality (for example, three in FIG. 8) of arcuate bending suppressing pieces 60 in the circumferential direction.

Hereinafter, a method of joining the pipes 2 and 4 in the above described pipe joint 1 will be described.

Figure 9:
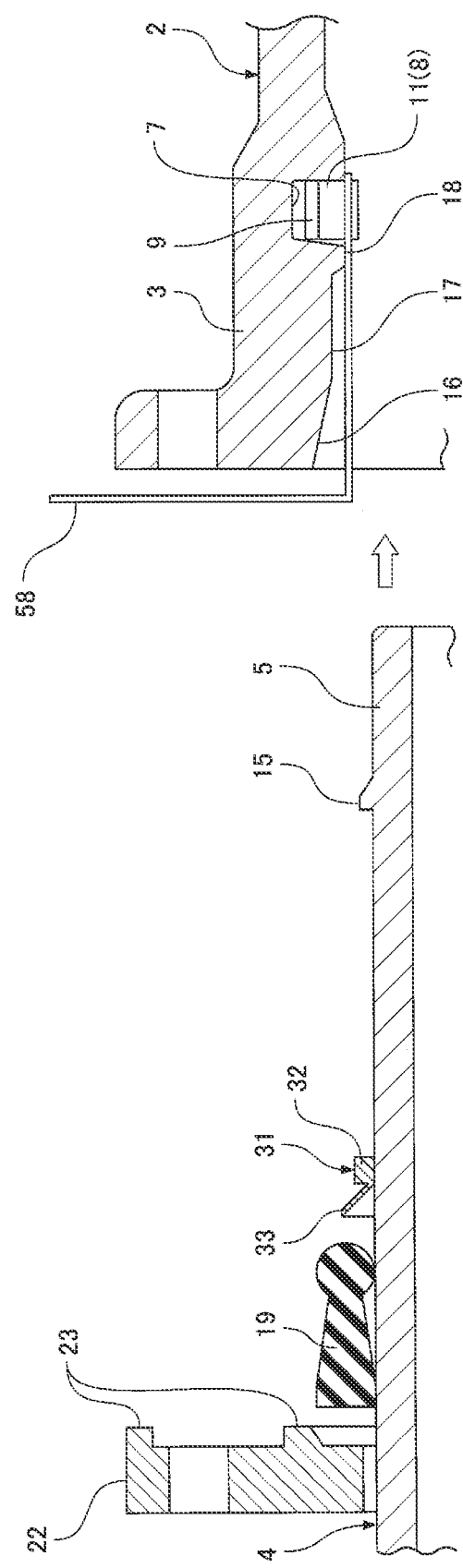
FIG. 9 is a sectional view to show a method of joining pipes in the pipe joint according to the same.

As shown in FIG. 9, in advance, the ring body 31, the seal ring 19, and the press ring 22 are externally fitted to the first pipe 4. Then, the press member 9 and the lock ring 8 are accommodated in the lock ring-accommodating groove 7 of the second pipe 2. Thereafter, as shown in FIG. 3, the width 12 of the cut portion 11 of the lock ring 8 is expanded by the expander 13 to expand the diameter of the lock ring 8. Next, as shown in FIG. 9, an L-shaped diameter expansion holder 58 is inserted into the cut portion 11 of the lock ring 8, and the expander 13 is removed to keep the lock ring 8 in a state in which the diameter is expanded.

Figure 10:
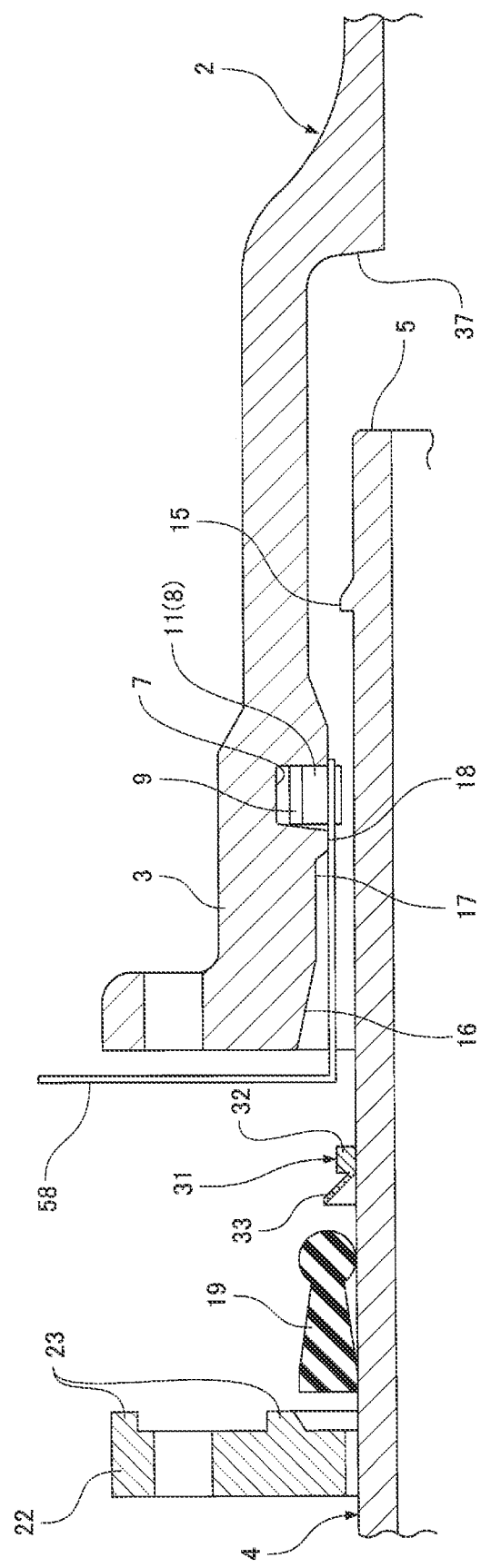
FIG. 10 is a sectional view to show the method of joining pipes in the pipe joint according to the same.

Thereafter, as shown in FIG. 10, the spigot 5 is inserted into the socket 3 so that the spigot protrusion 15 is passed through from the opening end side of the socket 3 to the back side of the socket 3 with respect to the lock ring 8. At this moment, since the lock ring 8 is maintained in a diameter expanded state by the diameter expansion holder 58, the spigot protrusion 15 easily passes through the inside of the lock ring 8.

Next, as shown in FIG. 11, the diameter expansion holder 58 is removed to reduce the diameter of the lock ring 8. As a result of this, the lock ring 8 holds the outer circumference of the spigot 5.

Figure 12:
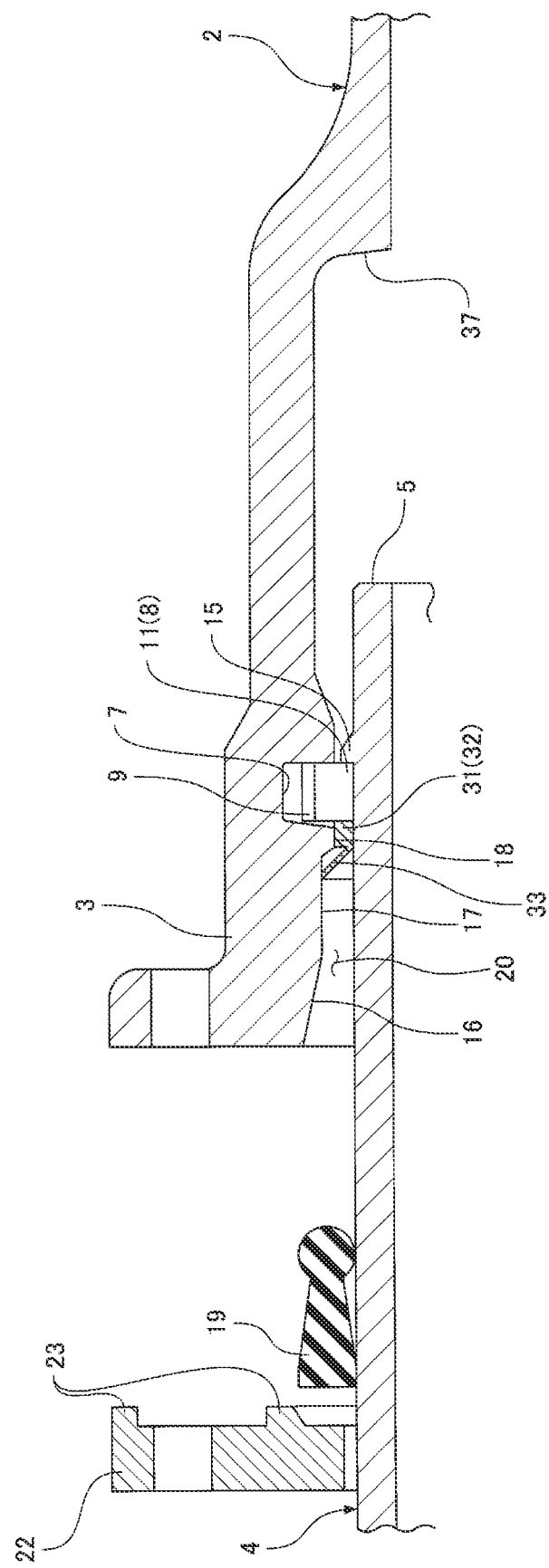
FIG. 12 is a sectional view to show the method of joining pipes in the pipe joint according to the same.

Thereafter, as shown in FIG. 12, with the spigot protrusion 15 being engaged with the lock ring 8, the ring body 31 is moved in the pipe axis direction, to be pressed, through the opening end part of the socket 3, into between the inner peripheral surface of the socket 3 and the outer peripheral surface of the spigot 5, and is inserted into between the inner peripheral surface of the socket protrusion 18 and the outer peripheral surface of the spigot 5.

As a result, the main body part 32 of the ring body 31 moves the spigot 5 in the pipe radial direction to reduce deviation in the pipe radial direction between the axis of the first pipe 4 and the axis of the second pipe 2. For that reason, the axis of the first pipe 4 approximately corresponds to the axis of the second pipe 2, thus enabling to perform centering of the pipes 2 and 4.

Figure 13:
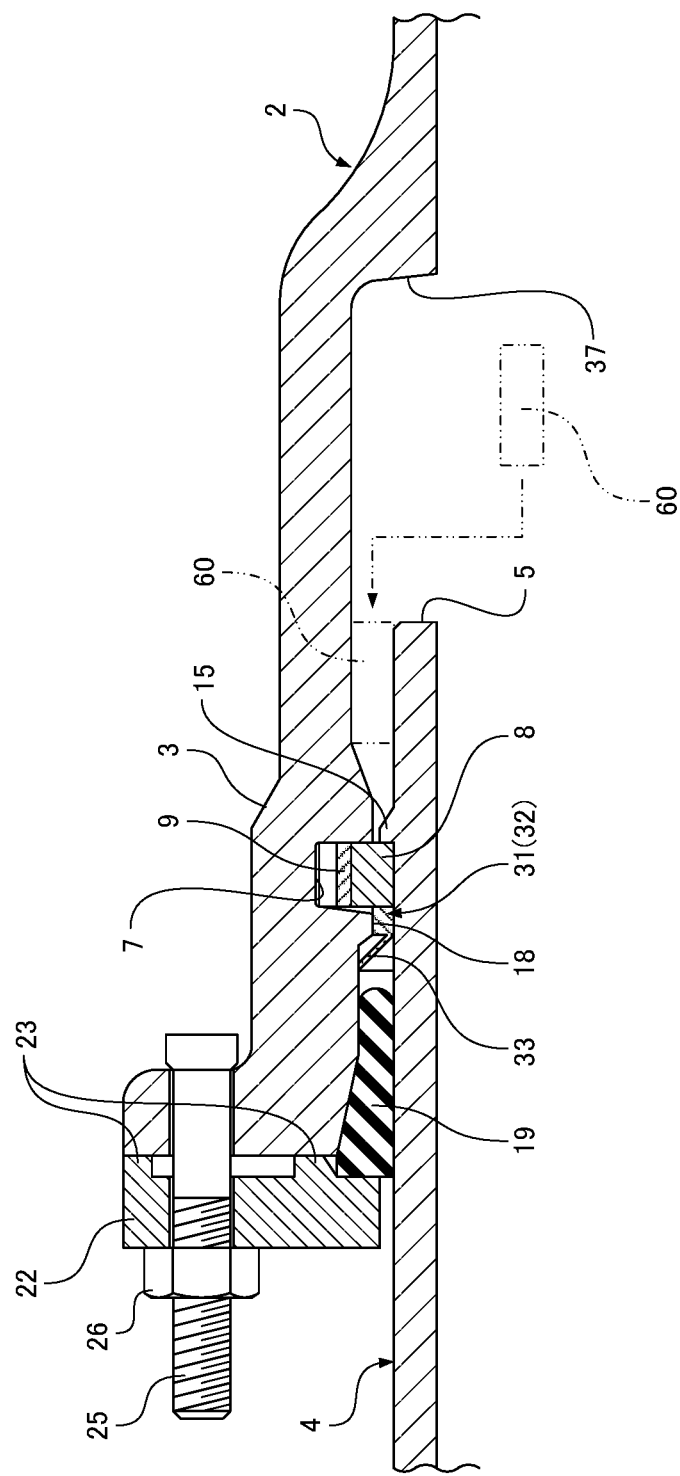
FIG. 13 is a sectional view to show the method of joining pipes in the pipe joint according to the same.

Thereafter, as shown in FIG. 13, the seal ring 19 is inserted from the opening end part of the socket 3 into the seal ring insertion space 20, the press ring 22 is connected to the opening end part of the socket 3 by using the bolt 25 and the nut 26, and the bolt 25 and the nut 26 are tightened until the abutting part 23 of the press ring 22 comes into abutment against the opening end face of the socket 3. As a result, the seal ring 19 is pressed into the seal ring insertion space 20 to be compressed in the pipe radial direction.

Thereafter, as shown by an imaginary line in FIG. 13, first, one bending suppressing piece 60 is inserted through between the distal end of the spigot 5 and the back end face 37 of the socket 3 into between the inner circumference of the socket 3 and the outer circumference of the spigot 5 in the range between the distal end of the spigot 5 and the spigot protrusion 15 so as to be disposed in a bottom part in the pipe joint 1. Next, the remaining two bending suppressing pieces 60 are respectively inserted through between the distal end of the spigot 5 and the back end face 37 of the socket 3 into between the inner circumference of the socket 3 and the outer circumference of the spigot 5 in the range between the distal end of the spigot 5 and the spigot protrusion 15 to be disposed in the circumferential direction.

Figure 14:
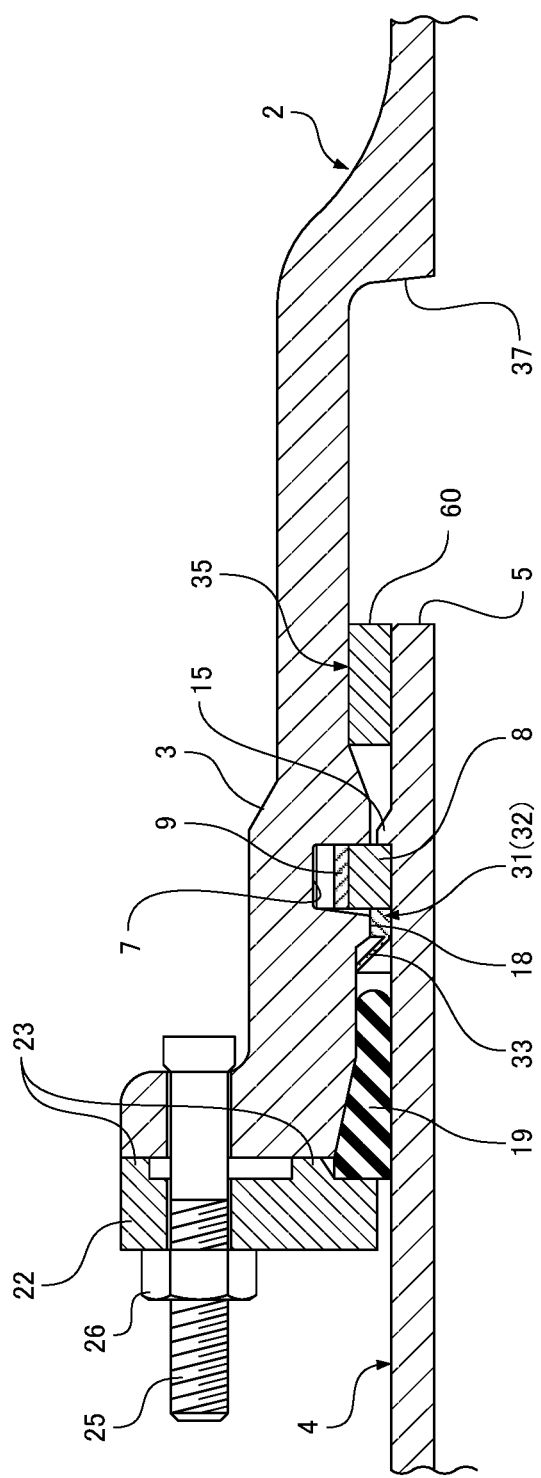
FIG. 14 is a sectional view to show the method of joining pipes in the pipe joint according to the same.
Figure 15:
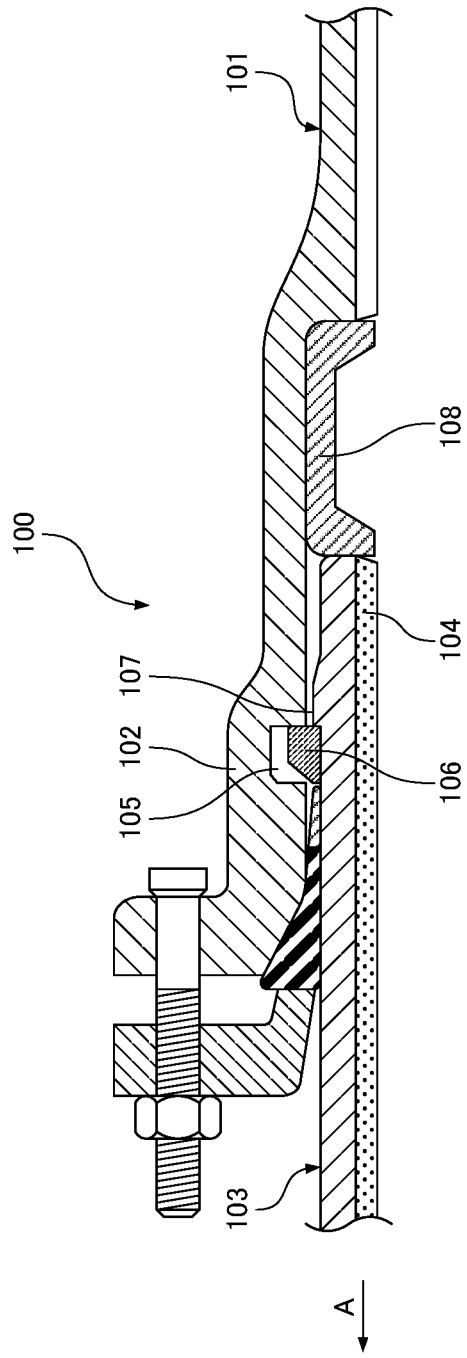
FIG. 15 is a sectional view of a conventional pipe joint.

In this manner, by disposing three bending suppressing pieces 60 in a ring shape as shown in FIG. 8, it is possible to easily dispose the bending suppressing member 35 between the inner circumference of the socket 3 and the outer circumference of the spigot 5 in the range between the distal end of the spigot 5 and the spigot protrusion 15 as shown in FIG. 14.

Thereafter, as shown in FIG. 6, one of the expansion/contraction suppressing pieces 40 is disposed in the bottom part in the socket 3, then one separate expansion/contraction suppressing piece 40 is disposed at each end part of the expansion/contraction suppressing pieces 40, and the end parts of these respective expansion/contraction suppressing pieces 40 are connected by the connecting plate 42 and the connecting bolts 43. Further, the remaining one expansion/contraction suppressing piece 40 is disposed at a top part in the socket 3, and the end parts of the adjacent expansion/contraction suppressing pieces 40 are connected by the connecting plate 42 and the connecting bolts 43.

By disposing, in this way, four expansion/contraction suppressing pieces 40 in a cylindrical shape, as shown in FIG. 2, the expansion/contraction suppressing member 34 is provided between the distal end of the spigot 5 and the back end face 37 of the socket 3. Thereafter, by turning each of centering bolt 48, the center of the expansion/contraction suppressing member 34 is aligned with the center of the pipe 2.

For example, when the center of the expansion/contraction suppressing member 34 is lower than the center of the pipe 2, the centering bolt 48 may be turned to raise the expansion/contraction suppressing member 34 with the centering bolt 48 so that the center of the expansion/contraction suppressing member 34 is aligned with the center of the pipe 2.

By joining the pipes 2 and 4 as described above, the bending suppressing member 35 is provided between the inner circumference of the socket 3 and the outer circumference of the spigot 5 in the range between the distal end of the spigot 5 and the spigot protrusion 15 in the pipe joint 1 as shown in FIG. 2. Therefore, the socket 3 and the spigot 5 are restricted in the bending direction C so that the bending rigidity of the pipe joint 1 increases, thereby enabling to achieve sufficient bending rigidity.

Further, since the expansion/contraction suppressing member 34 is provided between the distal end of the spigot 5 and the back end face 37 of the socket 3, the spigot 5 is inhibited from moving in the pipe axis direction with respect to the socket 3, thus restricting expansion/contraction of the pipe joint 1 and increasing the bending rigidity of the pipe joint 1.

Further, as a result of the bending suppressing member 35 abutting against one end face 34a of the expansion/contraction suppressing member 34 in the pipe axis direction, the bending suppressing member 35 is inhibited from deviating in the pipe axis direction from between the inner circumference of the socket 3 and the outer circumference of the spigot 5, and slipping out to between the distal end of the spigot 5 and the back end face 37 of the socket 3. As a result of this, it is possible to prevent the bending suppressing member 35 from slipping out from between the inner circumference of the socket 3 and the outer circumference of the spigot 5 to between the distal end of the spigot 5 and the back end face 37 of the socket 3 to be separated.

Further, as shown in FIG. 2, as a result of the abutting part 23 of the press ring 22 abutting against the opening end face of the socket 3, it is not possible to press the seal ring 19 further to the back side of the socket with the press ring 22. As a result, since the seal ring 19 will not be pressed in to the back side of the socket with excessive pressing force, and the back end part of the seal ring 19 will not abut against the ring body 31, it is possible to prevent damage of the ring body 31.

Further, as a result of the deviation prevention member 33 stretching between the inner peripheral surface of the socket 3 and the main body part 32 with the distal end part of the deviation prevention member 33 abutting against the straight section 17 of the inner peripheral surface of the socket 3, it is possible to prevent the main body part 32 of the ring body 31 from deviating from between the inner peripheral surface of the socket protrusion 18 and the outer peripheral surface of the spigot 5 to the side of the socket opening end (in the separation direction A).

Although, in the embodiment described above, the expansion/contraction suppressing member 34 is divided into four expansion/contraction suppressing pieces 40 as shown in FIG. 6, the number of the pieces will not be limited to four, and may be any plural number other than four.

Although, in the embodiment described above, the bending suppressing member 35 is divided into three bending suppressing pieces 60 as shown in FIG. 8, the number of pieces will not be limited to three, and may be any plural number other than three. Moreover, the bending suppressing pieces 60 adjacent to each other in the circumferential direction may be connected.

Although, in the embodiment described above, the expansion/contraction suppressing member 34 and the bending suppressing member 35 are provided as separate members in the pipe joint 1 as shown in FIG. 2, the expansion/contraction suppressing member 34 and the bending suppressing member 35 may be integrally formed, or may have an integrated structure in which they are connected by a connecting member such as a screw.

Although, in the embodiment described above, the expansion/contraction suppressing member 34 and the bending suppressing member 35 are provided in the pipe joint 1 as shown in FIG. 2, only the bending suppressing member 35 may be provided without the expansion/contraction suppressing member 34 being provided.

What is claimed is:
1. A pipe joint, comprising:
a spigot of a first pipe;
a socket of a second pipe, the spigot of the first pipe being inserted into the socket of the second pipe;
a lock ring-accommodating groove formed in an inner circumference of the socket;
a lock ring to be accommodated in the lock ring-accommodating groove; and
an engaging part formed in an outer circumference of the spigot at a position receding in a separation direction of the spigot from a distal end of the spigot, the engaging part being engaged with the lock ring from a back side of the lock ring in the separation direction of the spigot to prevent the spigot from separating from the socket,
wherein a bending suppressing member for restricting the socket and the spigot in a bending direction is provided between the inner circumference of the socket and the outer circumference of the spigot in a range between the distal end of the spigot and the engaging part,
wherein an expansion/contraction suppressing member for restricting the socket and the spigot in a pipe axis direction is provided between the distal end of the spigot and a back end part of the socket,
wherein an outer diameter of the expansion/contraction suppressing member is greater than an outer diameter of the spigot, and
wherein one end face of the expansion/contraction suppressing member in the pipe axis direction protrudes as a step to an outside in a pipe radial direction from the outer circumference of the spigot between the distal end of the spigot and the back end part of the socket and contacts the distal end of the spigot to inhibit the bending suppressing member from deviating in the pipe axis direction between the inner circumference of the socket and the outer circumference of the spigot and slipping out between the distal end of the spigot and the back end part of the socket.

2. The pipe joint according to claim 1, wherein
the bending suppressing member is a ring-shaped member.

3. The pipe joint according to claim 2, wherein
the bending suppressing member is divided into a plurality of arcuate bending suppressing pieces in a circumferential direction.

4. The pipe joint according to claim 1, wherein the expansion/contraction suppressing member is a ring-shaped member.

\* \* \* \* \*